United States Patent [19]

Kramer et al.

[11] 4,077,727
[45] Mar. 7, 1978

[54] BALL PEN INK CARTRIDGES CONTAINING INKS WHICH DO NOT FORM CRYSTALLINE MASSES WITHIN COPPER OR COPPER ALLOYS

[75] Inventors: Steven H. Kramer; Glenn F. Roquemore, both of Escondido; James J. Joyce, Saratoga, all of Calif.

[73] Assignee: Gordon S. Lacy, Escondido, Calif.

[21] Appl. No.: 550,921

[22] Filed: Feb. 19, 1975

Related U.S. Application Data

[60] Division of Ser. No. 325,721, Jan. 29, 1973, abandoned, which is a continuation-in-part of Ser. No. 231,701, Mar. 3, 1972, abandoned.

[51] Int. Cl.$^2$ ............................................. B43K 7/10
[52] U.S. Cl. ................................... 401/215; 106/23; 106/24; 106/30; 106/31; 106/32; 106/14; 106/241; 401/216; 401/217
[58] Field of Search .............................. 106/14, 20–24, 106/32; 401/212, 215, 216, 217

[56] References Cited

U.S. PATENT DOCUMENTS

| | | | |
|---|---|---|---|
| 3,095,859 | 7/1963 | Levy | 401/209 |
| 3,520,630 | 7/1970 | Gordon et al. | 401/215 |
| 3,659,951 | 5/1972 | Germann | 106/20 X |

FOREIGN PATENT DOCUMENTS 994,409  6/1965  United Kingdom .................. 106/20

OTHER PUBLICATIONS

Ellis, Printing Inks, Reinhold Publishing Corp., N.Y. 1940 pp. 118–127 relied on.
Kirk–Orthmer, Encyclopedia of Chemical Technology, 2nd Ed, vol. 6, pp. 588–602 relied on.
Ibid, vol. 2 (pp. 317–343 relied on).
Apps, Inks for Minor Printing Processes and Specialized Applications, vol. 3, London, Leonard Hill, 1963 pp. 202–217 relied on.

*Primary Examiner*—Joan E. Welcome
*Attorney, Agent, or Firm*—Sellers and Brace

[57] ABSTRACT

New ball point pen ink compositions are utilized to enhance the performance and very substantially extend the service life of ball pen ink cartridges by preventing the formation of an ink flow-blocking mass at the entrance to the brass or bronze nib or a mass which prevents the movement of the follower plug in a copper alloy cartridge. This is accomplished by dispersing in the ink proper one or more additives effective to prevent oxygen and moisture, which enter the cartridge and pass into the ink, from reacting with the metal constituents of the cartridge assembly to form metallic ions which react with ingredients of the ink proper in the formation of a flow-blocking mass.

10 Claims, 3 Drawing Figures

BALL PEN INK CARTRIDGES CONTAINING INKS WHICH DO NOT FORM CRYSTALLINE MASSES WITHIN COPPER OR COPPER ALLOYS

This is a division of our copending application Ser. No. 325,721, filed Jan. 29, 1973, now abandoned, which is a continuation-in-part of application Ser. No. 231,701, filed Mar. 3, 1972, now abandoned.

BACKGROUND OF THE INVENTION

Ink for ball point pens must be especially compounded for such unique usage. It differs greatly from pigmented printing inks on the one hand, and from aqueous fountain pen inks on the other hand. Thus it must have the required permanence of the color ingredient or dye, usually employed in a non-aqueous carrier, plus the necessary viscosity and flow characteristics for passing through the small clearance between the ball and its end socket. It must also be quick drying and non-spreading or non-smearing. Carriers which bleed or strike through to the reverse face of the writing paper must be eliminated.

The industry has succeeded in improving the writing quality of ball pen inks to a point at which they are far superior to earlier inks. However, one important and unresolved problem remains. Even these relatively good inks degrade with the passage of time and finally refuse to flow from the cartridge. This is the problem of shelf life or aging of the writing fluid. Aging occurs during the initial period of distribution to retail outlets in which it is shipped and sometimes stored in humid environments. Aging occurs on the shelves of the retailer. Finally it occurs during the period of usage by the final purchaser. Each of these periods may extend over many months. Ideally as long as there is any fluid in the supply cartridge or reservoir, the pen should be operative without hesitation or faltering.

Preserving the functional quality of an initially satisfactory formulation of ball point pen ink stored in a plastic cartridge is a very different problem from preserving its character in a sealed air-tight bulk container. Comparatively small quantities or "charges" of ball point pen ink are placed in small diameter tubes, commonly of polyethylene, polypropylene, or other plastic, and one end of which is open to the atmosphere. The other end is closed by a metal nib terminally carrying a ball rotatable in its socket. The open end of some larger diameter cartridges, too large for the ink to be retained by capillary action, may be plugged by a so-called "grease follower" or other type of "plug" which is not 100% impervious to oxygen and water and which moves into the cartridge as the ink flows out. During storage and use the ink of the cartridge is subject to the effects of contact with the atmosphere at this end even though closed by a plug.

Great quantities of these cartridge units including a writing nib are machine assembled, transported all over the world, and stored under all kinds of conditions. When purchased, or before being placed in use, a cartridge is simply thrust inside a tubular holder to provide a complete and instantly usable writing assembly. Such a newly assembled pen should function until the ink is entirely drained from the cartridge. If it does not, and today frequently it does not if the cartridge has aged for 1 to 3 years or less, under variable climatic conditions, the purchaser understandably is dissatisfied.

Examination of an aged disassembled pen which has failed to write has repeatedly shown what is known as "crystallization", that is, at the back or inner end of the bronze or brass tip which extends into the plastic body of the cartridge, a crystalline cap-shaped mass has accumulated which blocks the outlet passage going down the nib through which the ink flows to the writing ball at the point. This chokes off the continuous flow of ink and makes writing impossible. When this occurs, there is no practical step the user can take to reverse the process, and the entire cartridge or writing instrument is simply discarded. What formed this crystalline mass or cap had not hitherto been known. It did not form at this location in brass cartridges. It did not form there in the ink not in plastic cartridges. In brass cartridges usually of larger diameter and provided with a movable plug or closure at the open end spaced from the nib, the effect was noted not at the nib but at the interface of the plug and the ink. This effect caused the plug to freeze so that it could not follow the ink as its level approached the nib. The result was a vacuum which prevented the ink from flowing through the point.

Laboratory studies have now disclosed that the crystallization forms a heterogeneous mass of crystals known as a "crystal cap" through which ink cannot penetrate and which is characterized as follows:

1. This process is gradual;
2. During the early stages of crystal formation and before a cap is formed, the phenomena can account for starvation and skipping caused by larger crystals;
3. The crystalline mass is composed of metal salts and precipitated ink components and corrosion by-products;
   a. The consistency of the mixture resembles common asphalt in texture, viscosity and color.
   b. It can be several hundred microns to several millimeters in depth depending on the time and the particular ink formulation from which it was formed.
   c. A confirmation of the metallic content of the mass made by atomic absorption spectroscopy discloses a concentration of $Cu++$ and $Zn++$ approximately 300 times the normal concentration of these metals present elsewhere in the ink.

It has been observed that fountain pen inks, for example, may deposit sediment upon standing in an open container or pen due to evaporation of liquid which results in increased viscosity of the fluid. On the theory that something like this may have occurred in ball point pen ink, (1) volatile components were eliminated from the carrier, and (2) more impervious plastic cartridges were tried. The plastic body was even impregnated with metal flakes to prevent passage of liquid or gaseous components out through the walls. Those steps did not appreciably increase the storage stability. On aging, the resultant ink still produced gummy and/or crystalline particles which eventually choked off the flow.

Examination of many cartridges relative to the phenomenon of crystallization and crystal caps disclosed that the phenomenon did not occur with a nickel or stainless steel point but only with a point of brass, or other copper alloy such as bronze. It did not occur at the point when using a brass cartridge, but only in a plastic cartridge. It took place with various kinds of ball pen inks made by many manufacturers, the only significant difference being a variation in the length of time it took to develop a crystal cap in various of the ink formulas.

Until the present development all effort to eliminate the flow-blocking mass has failed to the continuous irritation of both users and manufacturers, such difficulty causing serious inventory and quality control problems for the latter.

OBJECTS OF THE INVENTION

It is a primary object of the present invention to provide an air-permeable ball point pen cartridge unit containing a charge of ink, which unit has a greatly extended service life with highly reliable and dependable writing characteristics.

Another object of the invention is the provision of a novel method of safeguarding the ink charge of a ball point pen against degradation due to migration in through the air-permeable plastic wall of the cartridge of moisture and oxygen.

Another object of the invention is the provision of improved ball point pen ink formulations having the capability of reacting with moisture and oxygen migrating into the ink through the cartridge wall so as to prevent the oxygen from reacting with the point of brass or other copper alloy so as to form metallic compounds which are critically essential to the subsequent formation of flow-preventing crystals in the ink.

Another object of the invention is the provision of an improved ball point pen ink embodying one or more additives having as their function the prevention of solubilization of metallic compounds derived from the pen nib and reacting with ingredients of the ink to degrade the ink and form an ink flow-blocking mass at the nib inlet.

Another object of the invention is the provision of a plastic ball point pen cartridge equipped with a brass or copper alloy nib and charged with ink incorporating an additive effective to react with oxygen and moisture before the moisture and oxygen can reach and react with metallic constituents of the nib.

Another object of the invention is the provision of a method of treating ball pen inks, without affecting their writing capability, by which the formation of flow-preventing crystals in the presence of a brass or copper alloy nib is materially retarded.

A further object of the invention is the provision of a method of fortifying ball pen inks by the addition of an ingredient which, without effect upon the writing characteristics of the ink, reacts with oxygen entering the ink so as to prevent its reaction with the metal of the writing nib.

A still further object of the invention is the provision of a method by which, without affecting the writing characteristics of the ink, the formation of flow obstructing crystals is retarded by including in the ink an ingredient effective to protect surfaces of the corrodable metal nib exposed to ink.

Another object of the invention is the provision of an ink embodying means to prevent the formation of a flow-preventing crystal cap when placed in a plastic cartridge with a brass or other copper alloy nib.

SUMMARY OF THE INVENTION

The present invention relates to ball point pens and more particularly to the ink-containing cartridge of such pens and to the ink stored therein. More specifically, the invention comprises:

1. A method of fortifying ball pen inks to retard the formation of ink flow-blocking masses upon aging;

2. A ball pen ink cartridge with an air permeable wall, a brass or copper alloy nib, and an ink additive which reacts with oxygen and moisture so as to prevent corrosion of the nib;

3. A formula of general application to ball pen inks which retards the formation of crystals in the ink, especially in the presence of brass or bronze in the cartridge.

STATEMENT OF THE INVENTION

Figure 1:
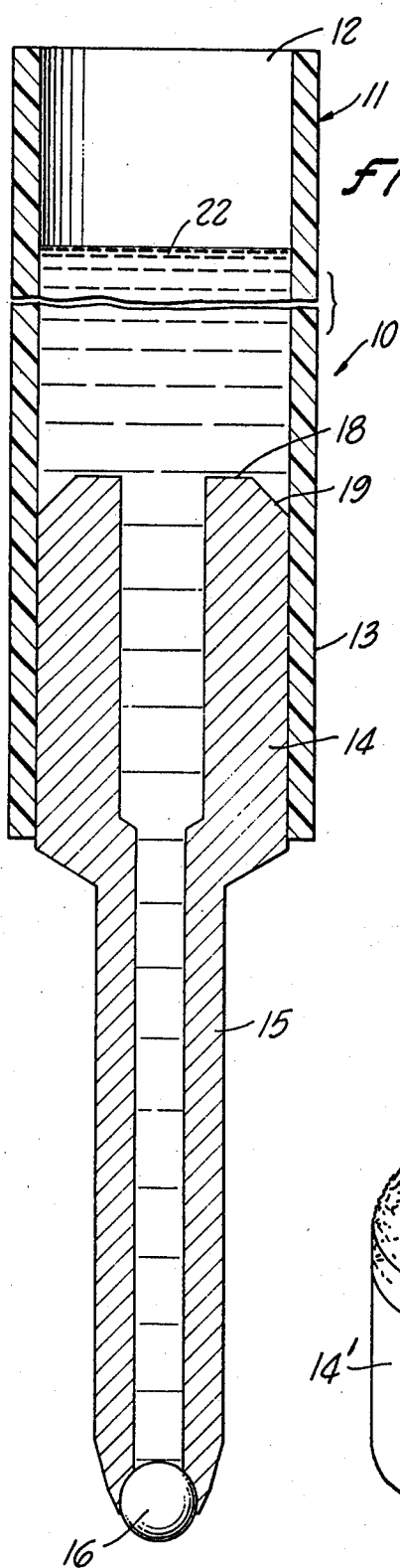
FIG. 1 is a longitudinal sectional view on an enlarged scale of a plastic ball point pen cartridge charged with ink in accordance with the principles of the present invention and showing the condition of the ink charge, after many months of non-use under adverse conditions, as being free of any flow-blocking mass at the nib entrance.

It has now been discovered that the herein described strangulative coagulation and cap formation in ball point pen ink cartridges arises from oxidative action set up at the brass-ink interface and results in the placing of copper and zinc compounds in solution. This interface is at the inner end of the brass or copper alloy nib in a plastic body cartridge, and alternatively at the point where the interface of the follower plug and the ink contact the brass cartridge in a brass body cartridge.

Corrosion of the brass or other copper alloy nib is now found to be an oxidative process produced by oxygen in the air passing through the plastic walls. The resulting copper and zinc oxides then react with acidic ingredients in the ink to produce insoluble products, usually organic copper and/or zinc carboxylates. The ionic reaction is accelerated by the presence of water or moisture. In an acidic medium, copper rich spots of the metal point serve as cathodes and zinc spots as anodes. The zinc oxide so formed combines with ink-derived fatty acid to produce insoluble, organic zinc carboxylates. These carboxylates, due to their poor solvency power, produce an environment behind the nib which precipitates otherwise soluble dye and/or resin components from the ink formulation, thus accounting for the varied crystal formations found in the crystal cap. In its early stages, such crystal formation may cause point clogging and "skipping" in laying down the ribbon of ink on the writing surface. This reaction occurs in the presence of water (moisture) and oxygen (air), the vapor mixture of which is found to enter the plastic cartridge, the reaction occurring particularly at the shoulder area of the metal nib. As previously noted, concentrations of $Cu++$ and $Zn++$ in the ink body in this area have been found to be approximately 300 times the normal concentration elsewhere in the ink. Such cap, which resembles common asphalt in texture, viscosity and color, can be several microns to several millimeters in depth. A thickness of a few thousandths of an inch is sufficient to completely stop ink flow. When the cap occurs in a brass or other metal cartridge, it takes the form of a ring at the inner face of the plug, a condition interfering with the movement of the plug and the flow of ink.

It has further been found that such precipitation and cap formation can be inhibited, and in terms of normal usage periods, can be substantially or completely prevented by incorporation into the ball point pen ink of one or more soluble substances which form the class of (a) antioxidants and (b) corrosion inhibitors. The combination of one member of each class is more effective and hence preferable to use of either one alone, since each hinders the chain of chemical reaction at a different point.

An effective antioxidant for the present purpose is defined as a substance soluble in solvents commonly used in ball pen inks, and which is capable of adsorbing or absorbing oxygen from its surroundings. An effective corrosion inhibitor for the present purpose is defined as an ink-solvent soluble additive capable of preventing or inhibiting corrosion of copper alloys such as brass or bronze, whether the corrosion is oxidative, reductive, electrolytic, or chemical in nature.

A large class of soluble dyes is now known and used for ball point pen inks and are suitable for such formulations. These dyes are dispersed usually in a carrier provided by polar organic agents, such as polyhydric alcohols which have a surface tension within the range of about 20 to about 60 dynes per square centimeter and preferably about 30 to 45 dynes per square centimeter. Typical of such agents are glycerol, benzyl alcohol, ethylene and diethylene glycol, and mono- and dialkyl or aryl ethers of ethylene and diethylene glycol. Generally they form about 30% weight to about 70% weight of the final ink.

To such a carrier is added from zero up to about 25% w of fatty acid and from zero up to about 50% w of resin. The fatty acid component is chosen for the properties of:

1. Increasing dye solubility;
2. Imparting lubricity to the metal ball in writing;
3. Enhancing color development of the dye.

Examples of suitable fatty acids are:
1. Oleic acid;
2. Decanoic acid;
3. Generally organic acids whether straight chain or branched, C-4 to C-20 in length, preferably saturated and derived from either synthetic or natural sources. Examples of these include 2-ethyl hexanoic acid, nonanonic acid, palmitic acid, etc.

The resin component is usually selected for the properties of adjusting the viscosity of the ink to suitable levels. Examples of suitable resins are coumarone indene, ketonealdehyde condensation, pine tar derived resins, zein, coal tar resins, etc.

To the typical ink so compounded is added an ink soluble antioxidant and/or an ink soluble corrosion inhibitor which should pass the "Accelerated Heat Aging Test" plus at least one of the "Six-Day Accelerated Corrosion Test" or the "Two-Hour Accelerated Copper Alloy Weight Loss Test", each of which tests is set forth below.

In compounding, typically, the solvents and fatty acids are first measured into a jacketed kettle and warmed to about 60° C to about 90° C. with agitation. Resin is then added and agitated until dissolved, the dyes and corrosion inhibitor are then mixed in and the antioxidant is added. Any impurities or insoluble matter is removed by filtration or centrifuge, and final adjustment is made for viscosity and pH. Viscosity may vary from about 2000 centipoise to about 25,000 centipoise but may be higher for special types of ball pen inks. pH usually varies from about 4.5 to 9.0.

The batch can be shipped in bulk, or may be packaged in containers from 55 gallons down to 1 pint in size, to a plant whose machinery charges it into reservoir cartridges.

Either a corrosion inhibitor or an antioxidant as herein defined has some effect in reducing corrosion of the brass point but that used together they are superior and give much more than a simple additive effect can be seen from the following test.

Cartridges were placed entirely within a septum bottle which contained a totally water-saturated, pure oxygen atmosphere, and the whole assembly then maintained for 14 days at 80° C., a test intended to be comparable in its aging effect to a shelf life in excess of one year under normal conditions. The brass points were weighed before assembly and at the end of the test cleaned off with solvent and again weighed.

| FORMULAE #2 - BLUE | | | | |
|---|---|---|---|---|
| | A | B | C | D |
| Benzyl Alcohol | 22. | 22. | 22. | 22. |
| Ethylene Glycol Phenyl Ether | 22. | 22. | 22. | 22. |
| Oleic Acid | 12. | 12. | 12. | 12. |
| Blau Base KG (Solvent Blue 64, BASF) | 15.9 | 15.9 | 15.9 | 15.9 |
| Victoria Blue Base F4R (Solvent Blue 2, BASF) | 7.5 | 7.5 | 7.5 | 7.5 |
| Hexane Triol Phthalate Resin | 15.9 | 15.9 | 15.9 | 15.9 |
| 2,2-Methylene bis-(4-methyl-6-tertiary-butyl phenol)(antioxidant) | 0. | 2.0 | 0. | 2.0 |
| Benzotriazole (corrosion inhibitor) | 0. | 0. | .1 | .1 |
| Total Weight in Grams | 100.0 | 102.0 | 100.1 | 102.1 |
| Percentage Weight Loss of Nib by corrosion | .82 | .48 | .72 | .02 |

It will be seen that the effect of either an antioxidant or a corrosion inhibitor alone was some reduction in corrosion, but the use of both together gave a much more than additive result.

Evidence of the deterioration of a ball point pen ink in a conventional vapor-permeable plastic cartridge, such as a polypropylene cartridge, as measured by the corrosion of the brass nib of the cartridge containing the ink, can be seen from the following accelerated aging test.

SIX-DAY ACCELERATED CORROSION TEST

Ball point pen inks were formulated in accordance with the present invention and using various antioxidants and/or corrosion inhibitors as follows:

| FORMULAE #1 - BLUE | |
|---|---|
| | Parts by Weight |
| Ethylene Glycol Mono Phenyl Ether | 20 |
| Butylene Glycol 1,3 | 20 |
| Fatty Acid (Oleic Acid Type) | 12 |
| Solvent Blue 5 Dye (such as Victoria Pure Blue BO Base, American Cyanamid, Hectolene Pure Blue BO Base, Dye Specialties, Inc.) | 6 |
| Solvent Violet 8 Dye (such as Methyl Violet Base, DuPont, American Cyanamid, Tenneco Chemicals Co.) | 4 |
| Resin, Ketone condensation type | 35 |
| Resin, polyvinylpyrolidone type | 3 |
| Corrosion Inhibitor | 1.0 |
| Antioxidant | 2.0 |

| FORMULAE #1 - BLUE | |
|---|---|
| | Parts by Weight |
| | 103.0 |

The corrosion test performed was an accelerated test followed by visual observation of corrosion of the heel and shoulder portions of a brass nib. The antioxidant and/or corrosion inhibitor to be tested were mixed in Formula #1.

When an antioxidant was being tested for its corrosion effect on a brass point, 1.0% wt of a corrosion inhibiting mixture of diethylamine salts of bis (octylphenyl) hydrogen phosphate and octylphendyl dihydrogen phosphate was present.

When a corrosion inhibitor was being tested for its corrosion effect on the brass point, 2.0% wt of 2,2' Methylene bis (4-methyl-6-tertiarybutylphenol) was present as an antioxidant.

The modified ink involved was placed in a commercial plastic cartridge with a sealed ball pen tip. The tip end of the plastic cartridge was then inserted into a reaction vessel. Oxygen and 1/10cc. of Distilled Water were also inserted into the reaction vessel. The whole assembly was then aged for 6 days at 80° C. The brass points were then retrieved, washed clean, and microscopically examined at 60 X for corrosion.

A rating of "Pass" or "Fail" was assigned to each additive based on the results of this examination. A "Fail" rating was assigned when the lathe marks normally present on the heel of the point, could not be easily discerned or where noticeable cavitation as a result of corrosion had taken place. Care was taken to not assign a "Fail" rating where the heel of the nib was only discolored but not actually corroded as described above.

Various oxidants and corrosion inhibitors receiving a "Pass" rating by this test are:

| ADDITIVE | FUNCTION |
|---|---|
| 2,5-Ditertiary Butyl Hydroquinone | Antioxidant |
| Hydroquinone Mono Methyl Ether | " |
| 4-Dodecyloxy-2-Hydroxy Benzophenone | " |
| Mono Tertiary Butyl Hydroquinone | " |
| Butylated Hydroxyanisole | " |
| Hydroquinone | " |
| 2,2-Methylene-bis (4-Ethyl-6-Tert Butyl Phenol) | " |
| Octylated Diphenyl Amine | " |
| Hydroquinone Monobenzyl Ether | " |
| iso Propoxy Diphenylamine | " |
| Aldol Alpha-Naphthylamine | " |
| Polymerized Trimethyl Di-hydroquinoline | " |
| Condensation product of diphenyl amine, and acetone | " |
| Diphenyl para Phenylenediamine | " |
| Phenyl beta naphthylamine isopropoxy | " |
| 2,6-Ditertiary Butyl-4-Methyl Phenol | " |
| Octadecyl 3-(3,5 Ditertiary Butyl-4-Hydroxy Phenol Propionate) | " |
| Polymeric Hindered Phenol | " |
| N-Acetyl-p-aminophenol | " |
| N-Butyryl-p-aminophenol | " |
| Lauryl-p-aminophenol | " |
| Stearyl-p-aminophenol | " |
| Phenyl beta naphthylamine | " |
| Bis (octylphenyl) hydrogen phosphate | Corrosion Inhibitor |
| Zinc Dibutyldithiocarbamate | " |
| Trimer Acid | " |
| N,N'-disalicylol-1,2-propane diamine | " |
| Benzotriazole | " |
| Methyl Benzotriazole | " |
| Mixture of diethylamine salts of bis (octylphenyl) hydrogen phosphate and | " |

| ADDITIVE | FUNCTION |
|---|---|
| octylphenyl dihydrogen phosphate | |

Other known effective antioxidants are: 2,5-ditertiary amyl hydroquinone; styrenated phenol; hindered phenol; mixed diaryl-p-phenylene diamine; blend of diaryl and alkylaryl-p-phenylene diamines; dilauryl thiodipropionate; ditertiary butyl thiodipropionate; 1,1-thio-bis-(2-naphthol); and 2,2-thio-bis-(4-methyl-6-tertiary butyl phenol). Other known effective corrosion inhibitors are: nonyl phenoxy acetic acid; mercapto benzothiazole; sodium-2-mercapto benzothiazole; sorbitan fatty acid ester; and sorbitan partial fatty acid ester.

TWO-HOUR ACCELERATED COPPER ALLOY WEIGHT LOSS TEST

A quantity of powdered brass is obtained from the same brass as used for points of ball point pens. Such a sample representative had the following characteristics:

| Cu | 58.5 to 60.0% weight |
|---|---|
| Pb | 3.20 to 3.80% |
| Fe | 0 to 0.15% |
| Sn | 0 to 0.20% |
| Ni | 0 to .15% |
| Zn | Remainder |
| Grain size: | .030 mm maximum |
| Elongation: | 2% in 2" |
| Tensile strength: | 78,000 - 88,000 psi |
| Mesh size: | 40/60 (Tyler Mesh) |

A simplified liquid carrier or vehicle consisting of a mixture of polyhydric alcohol and saturated carboxylic acid is used as a representative standard for interaction with the brass sample contained in a sealed moisture-saturated atmosphere at elevated temperature. 30 ml. of clean dry brass powder is weighed to the nearest .0001 gm. into a 125 ml. reaction vessel 30 ml. of a 50:50 by weight test mixture of ethylene glycol Mono Phenyl Ether:Oleic Acid, containing either 10% antioxidant of 5% corrosion inhibitor or both, is then added by Class A Pipet. 1.5 ml. of Distilled Water is then charged onto a ½ inch × ½ inch × 1½ inch cellulose sponge which is then suspended over the solution of metal in the reaction vessel, by a cotton thread. A 1½ inch Teflon coated stirring bar is then added and the reaction vessel sealed with septum and aluminum crimp. The bottle containing the sponge, metal, stirring bar and test solution is then flushed with pure oxygen by syringe needle inserted through the elastic septum which closes upon withdrawal of the needle. This assembly is then placed on a 100° C hot plate equipped with magnetic stirrer operating at 80 rpm. for 2 hours, after which the solution is placed on a tared "Alundum" Soxhlet cup and extracted for 1 hour with methylene chloride in a Soxhlet extractor. The cup and metal are then dried and weighed to determine the weight of brass lost to the test mixture.

The above test, in the absence of any corrosion inhibitor or antioxidant additive, showed a weight loss of the brass of greater than 2%. In comparison, it has been found that an additive, e.g. up to 10% wt antioxidant or up to 5% wt corrosion inhibitor or any combination of additives from the two classes which do not exceed a total weight of about 15% and which results in no greater than 2% weight loss of brass, as determined by the present test, can advantageously be used to inhibit obstructive crystal formation in ball point pen inks which include acidic ingredients which effect corrosion of the metal point, as for example, ink containing dyes, solvents previously mentioned, fatty acid or acids, and possibly resins in their compositions.

ACCELERATED HEAT AGING TEST

The following formula containing the additives is prepared as specified above for Formula #1 — Blue. To this formula either an antioxidant or corrosion inhibitor or both are added in the amounts specified. The ink is then charged into 5 brass and 5 plastic cartridges and medium size ball points fitted to them. The brass cartridges are then placed in an oven maintained at 60° C for 5 weeks. At the end of every week three of the cartridges are taken out, written out for 100 cycles (ovals) on a Hartley or Anja General Services Administration writing machine and then returned to the oven for another week's aging. The two cartridges which are not written out weekly are saved for the full 5 weeks and then written out for 800 cycles (ovals). The plastic cartridges are treated the same except that the oven temperature is 55° C.

The cartridges must then write without excessive skipping or starvation in the written line, and there must be a good color laydown, with no change of color.

Any of the qualifying antioxidants can be used with any of the qualifying corrosion inhibitors or with other qualifying members of such classes as herein defined.

The ball pen ink fortified in accordance with the present invention is positioned in a cartridge as illustrated in the drawing. In FIG. 1 there is shown a ball point pen cartridge, designated generally 10, including an elongated tubular plastic body 11 open to the atmosphere at its upper end 12. The body 11 is sufficiently small in diameter that capillary action prevents ink from escaping from the open end. The body retains the ink but has a limited permeability in a manner characteristic of plastics, to the extent that some air and moisture can pass therethrough and into the ink. The lower end 13 of the cartridge body has a snug frictional fluid-tight fit over the enlarged upper end 14 of a tubular brass nib or point 15. The smaller diameter lower tubular end of the nib 15 carries a rotary ball 16 seated in a semi-spheroid socket 17. The upper end of the nib through which the ink enters, includes an annular heel 18 and a chamfered shoulder 19. This chamfered surface serves as a pilot to facilitate assembly of the cartridge to the nib. The interior of the cartridge is charged with ink 22 adapted, in the manner common to ball pens to flow downwardly through channels 20 of the nib 15 to the ball 16 to be applied to a writing surface by the rotation of said ball.

In FIG. 1 the cartridge is in an operative condition and the ink is free to flow from the pen as described. This condition exists when the cartridge is new and desirably should continue until all of the ink in the cartridge has been used. The wall of the plastic body 11 of the cartridge permits moisture-laden air to pass therethrough and into the ink. With common unfortified ball pen ink in the cartridge, the oxygen in the air and the water, aided by acidic components inherent in ball pen ink, corrode the brass point. The by-products of this corrosion then combine with other ingredients of the ink formula to provide crystallization. This crystallization begins at the shoulder 19 of the point and gradually works its way up to the heel 18 and finally results in a cap which entirely circles the end of the nib and closes the passage 20 therethrough, preventing the flow of ink downwardly to the ball 16. This result is clearly illustrated in FIG. 2 in which similar parts are designated by the same reference characters as on FIG. 1 but with a prime added thereto, the cap being shown at C. An enlarged showing of the cap found in FIG. 3.

Figure 2:
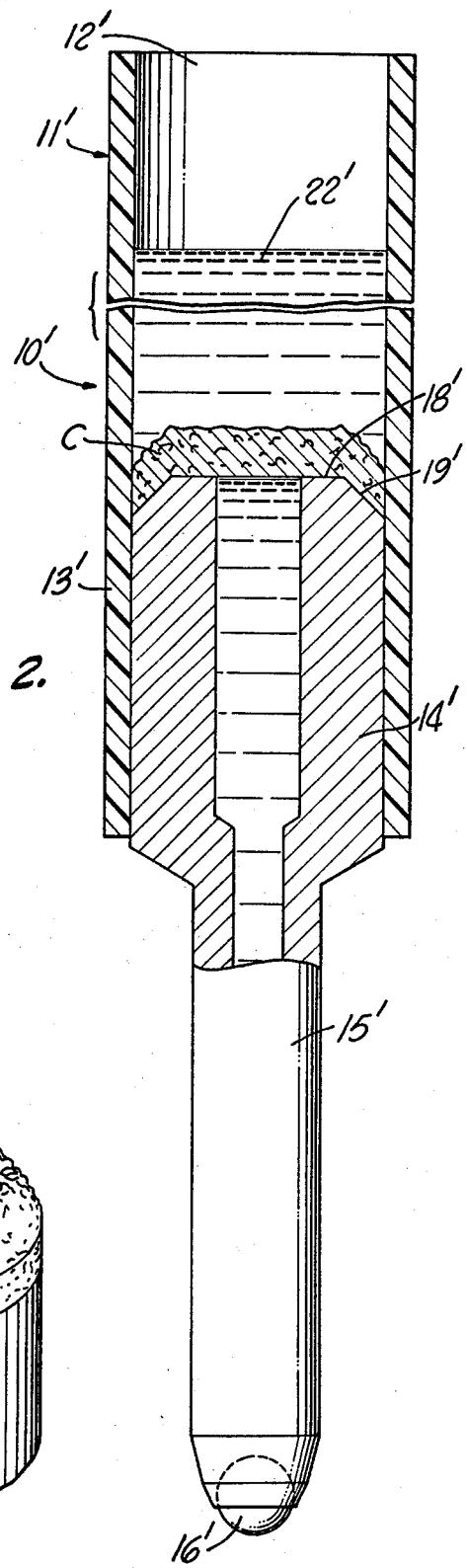
FIG. 2 is a sectional view of an identical cartridge charged with the same ink which lacks any of the invention additive ingredients and illustrating a typical cap-like mass overlying the entrance end of the nib which has formed as the ink aged.
Figure 3:
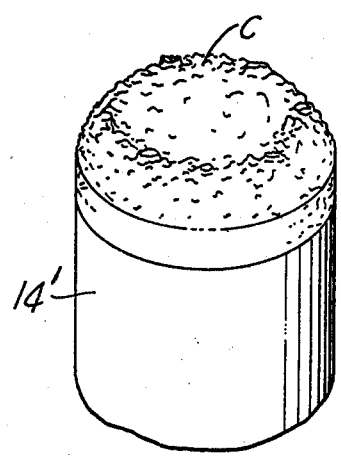
FIG. 3 is a perspective view of the upper and inner end portions of the nib shown in FIG. 2, illustrating the surface appearance of the flow-blocking cap.

As is clearly evidenced in FIGS. 2 and 3, no ink can enter the nib through the cap C.

In the present invention the ink in the cartridge body 11 is provided with the antioxidant and/or with the corrosion resistant ingredient as disclosed. When the moisture and oxygen enter the ink as a part of the air the antioxidant combines with the oxygen and prevents the latter from reacting with the copper and zinc in the brass to form undesirable by-products. The prevention of these undesirable by-products prevents the formation of crystals in the ink itself.

The antioxidant improves the life of the ink as does the corrosion inhibitor. Together they produce a superior result.

At the end of the cartridge body 11 spaced from the nib the end surface of the ink is exposed to the air. If the body 11 is made of metal, i.e. brass, the factors which produce oxidation at the end of the nib are also present at the line of contact of the ink and the plug. Formation of corrosion by-products here also is prevented according to the present invention by the antioxidant and the corrosion inhibitors in the manner previously described.

The following are examples of various ball point pen ink formulae embodying antioxidants and/or corrosion inhibitors according to the present invention:

EXAMPLE I

|  | Parts by Weight |
|---|---|
| Ethylene Glycol Mono Phenyl Ether | 20 |
| Propylene Glycol | 20 |
| Fatty Acid (Oleic Acid Type) | 12 |
| Solvent Blue 5 Dye (such as Victoria Pure Blue BO Base, American Cyanamid, Hectolene Pure Blue BO Base, Dye Specialties, Inc.) | 6 |
| Solvent Violet 9 Dye (Crystal Violet Base, BASF, American Dye Specialties, Inc.) | 4 |
| Resin, ketone condensation type | 35 |
| Resin, polyvinyl pyrolidone type | 3 |
| Mixture of diethylamine salts of bis (octylphenyl) hydrogen phosphate and octylphenyl dihydrogen phosphate (corrosion inhibitor) | 1.0 |
| 2,2-Methylene-bis (4-Ethyl-6-Tert-Butyl Phenol) (antioxidant) | 2.0 |
| | 103.0 |

This formula is prepared by measuring the solvents and fatty acids into a jacketed kettle while being warmed and agitated. Both resins are then added and agitated until dissolved following which the dye and corrosion inhibitor are added and agitated until dissolved. The antioxidant is then added and agitated until dissolved. Thereafter the mixture is filtered or centrifuged to remove impurities and insoluble matter and any final adjustments on viscosity and pH are made.

EXAMPLE II

|  | Parts by Weight |
|---|---|
| Hexylene Glycol | 8.0 |
| Propylene Glycol | 22.5 |
| Fatty Acid (Oleic Type) | 5.6 |
| Beta Naphthol | 8.0 |
| Solvent Blue 5 Dye (Victoria Pure Blue | 4.7 |

-continued

| | Parts by Weight |
|---|---|
| BOS Base, American Cyanamid, BASF) Solvent Blue 38 Dye (American Cyanamid, American Aniline, duPont, National Aniline, etc) | 31.5 |
| Phenol modified Coumarone-Indene Resin | 19.7 |
| Mixture of diethylamine salts of bis (octylphenyl) hydrogen phosphate and octylphenyl dihydrogen phosphate (corrosion inhibitor) | 1.6 |
| 2,2-Methylene-bis (4-Ethyl-6-Tert Butyl Phenol) (antioxidant) | 2.0 |
| | 103.0 |

The formula is prepared as described in preparing the Example I formula.

| | Parts by Weight |
|---|---|
| Ethylene Glycol Mono Phenyl Ether | 29.0 |
| Butylene Glycol 1,3 | 9.4 |
| Diethylene Glycol Mono Phenyl Ether | 9 |
| Fatty Acid (Oleic Type) | 1.5 |
| Di-Phenyl Guanidine | .9 |
| Red Organic Pigment Paste | 7 |
| Solvent Orange 25 Dye (duPont, American Cyanamid) | 10 |
| Solvent Red 49 Dye (Rhodamine B Base, BASF duPont, National Aniline, American Cyanamid) | 14 |
| Ketone condensation resin | 16 |
| Mixture of diethylamine salts of bis (octylphenyl) hydrogen phosphate and octylphenyl dihydrogen phosphate (corrosion inhibitor) | 1.0 |
| 2,2-Methylene-bis (4-Ethyl-6-Tert Butyl Phenol) (antioxidant) | 2.0 |
| | 103.0 |

This formula is prepared as described in preparing the Example I formula.

EXAMPLE IV

| | Parts by Weight |
|---|---|
| Ethylene Glycol Mono Phenylether | 11 |
| Diethylene Glycol Mono Phenylether | 30 |
| Saturated Fatty Acid (C-9 to C-11 carbon atoms) | 11 |
| Saturated Fatty Acid (isostearic type) | 5 |
| Solvent Black 7 Dye (National Aniline BASF, American Cyanamid) | 28 |
| Phenol modified Coumarone Resin | 5.1 |
| Solvent Violet 8 Dye (Methyl Violet base, American Cyanamid, BASF) | 2.5 |
| Carbon Black Dispersion | 5 |
| Polyvinyl Pyrolidone Resin | 2.4 |
| Mixture of diethylamine salts of bis (octylphenyl) hydrogen phosphate and octylphenyl dihydrogen phosphate (corrosion inhibitor) | 1.0 |
| 2,2-Methylene-bis (4-Ethyl-6-Tert Butyl Phenol) (antioxidant) | 2.0 |
| | 103.0 |

This formula is prepared as described in preparing the Example I formula.

EXAMPLE V

| | Parts by Weight |
|---|---|
| Dipropylene Glycol | 10 |
| Fatty Acid (Oleic Type) | 9 |
| Carbon Black Dispersion | 4 |
| Phenol modified Coumarone Resin | 63.3 |
| Solvent Blue 5 Dye | 8.5 |

-continued

| | Parts by Weight |
|---|---|
| Solvent Violet 8 Dye | 4.9 |
| Solvent Black 3 Dye (Oil Soluble Deep Black BB, BASF; Fat Black HB, Hoechst) | .3 |
| Mixture of diethylamine salts of bis (octylphenyl) hydrogen phosphate and octylphenyl dihydrogen phosphate (corrosion inhibitor) | 1.0 |
| 2,2-Methylene-bis (4-Ethy-6-Tert Butyl Phenol) (antioxidant) | 2.0 |
| | 103.0 |

This formula is prepared as described in preparing the Example I formula.

EXAMPLE VI

| | Parts by Weight |
|---|---|
| Ethylene Glycol Mono Phenyl Ether | 24 |
| Dipropylene Glycol | 23 |
| Fatty Acid (Oleic Type) | 2 |
| Solvent Blue 2 Dye (Victoria Blue base, F4R, BASF) | 2 |
| Solvent Yellow 47 Dye | 8 |
| Ketone condensation resin | 41 |
| Mixture of diethylamine salts of bis (octylphenyl) hydrogen phosphate and octylphenyl dihydrogen phosphate (corrosion inhibitor) | 1.0 |
| 2,2-Methylene-bis (4-Ethyl-6-Tert Butyl Phenol) (antioxidant) | 2.0 |
| | 103.0 |

This formula is prepared as described in preparing the Example I formula.

EXAMPLE VII

| | Parts by Weight |
|---|---|
| Diethylene Glycol Mono Phenyl Ether | 22.5 |
| Butylene Glycol 1,3 | 21.5 |
| Saturated Fatty Acid (Oleic acid type) | 6.5 |
| Solvent Red 49 Dye (duPont, General Aniline and Film, American Cyanamid) | 7.0 |
| Solvent Brown 20 Dye (American Cyanamid) | 4.0 |
| Ketone condensation resin | 38.5 |
| Mixture of diethylamine salts of bis (octylphenyl) hydrogen phosphate and octylphenyl dihydrogen phosphate (corrosion inhibitor) | 1.0 |
| 2,2-Methylene-bis (4-Ethyl-6-Tert Butyl Phenol) (antioxidant) | 2.0 |
| | 103.0 |

This formula is prepared as described in preparing the Example I formula.

EXAMPLE VIII

| | Parts by Weight |
|---|---|
| Diethylene Glycol Mono Phenyl Ether | 41 |
| Saturated Fatty Acid (C-9 to C-11 carbon atoms) | 11 |
| Saturated Fatty Acid (Isostearic type) | 5 |
| Solvent Black 7 Dye (National Aniline, BASF, American Cyanamid) | 35 |
| Phenol modified Coumarone Resin | 5.1 |
| Solvent Violet 9 Dye (Crystal Violet Base; BASF, American Dye Specialties, Inc.) | .5 |
| Polyvinyl Pyrolidone Resin | 2.4 |
| 2,2-Methylene-bis (4-Ethyl-6-Tert Butyl Phenol) (antioxidant) | 2.0 |
| | 102.0 |

This formula is prepared as described for Example I except that only the antioxidant additive is added prior to filtering or centrifuging.

EXAMPLE IX

|  | Parts by Weight |
|---|---|
| Ethylene Glycol Mono Phenyl Ether | 41 |
| Saturated Fatty Acid (C-9 to C-11 carbon atoms) | 11 |
| Saturated Fatty Acid (Isostearic type) | 5 |
| Solvent Black 7 Dye (National Aniline, BASF, American Cyanamid) | 32.4 |
| Phenol modified Coumarone Resin | 5.1 |
| Solvent Blue 3 Dye (American Cyanamid Tenneco Chemicals, Inc.) | .5 |
| Carbon Black Dispersion | 5 |
| Mixture of diethylamine salts of bis (octylphenyl) hydrogen phosphate and octylphenyl dihydrogen phosphate (corrosion inhibitor) | .5 |
|  | 100.5 |

This method is prepared as described in preparing the Example I formula.

EXAMPLE X

|  | Parts by Weight |
|---|---|
| Ethylene Glycol Mono Phenyl Ether | 41 |
| Saturated Fatty Acid (C-9 to C-11 carbon atoms) | 11 |
| Saturated Fatty Acid (Isostearic type) | 5 |
| Solvent Black 7 Due (National Aniline, BASF, American Cyanamid) | 30 |
| Phenol modified Coumarone Resin | 7.5 |
| Solvent Blue 3 Dye (American Cyanamid, Tenneco Chemicals, Inc.) | .5 |
| Carbon Black Dispersion | 5 |
| Mixture of diethylamine salts of bis (octylphenyl) hydrogen phosphate and octylphenyl dihydrogen phosphate (corrosion inhibitor) | .5 |
|  | 100.5 |

This method is prepared as described in preparing the Example I formula.

EXAMPLE XI

|  | Parts by Weight |
|---|---|
| Ethylene Glycol Mono Phenyl Ether | 10 |
| Propylene Glycol | 30 |
| Fatty Acid (Oleic type) | 12 |
| Solvent Blue 2 Dye (such as Victoria Blue Base, F4R, BASF) | 6 |
| Solvent Violet 8 Dye (such as Methyl Violet Base, duPont, American Cyanamid, Tenneco Chemicals, Inc.) | 4 |
| Resin, ketone condensation type | 35 |
| Resin, polyvinyl pyrolidone type | 3 |
| Mixture of diethylamine salts of bis (octylphenyl) hydrogen phosphate and octylphenyl dihydrogen phosphate (corrosion inhibitor) | .5 |
|  | 100.5 |

This method is prepared and described in preparing the Example I formula.

It is to be understood that the present invention is of greatest application to ball point pen inks containing soluble dyes and is not limited to a particular ink formulation or formulations. It is of similar application to ball pen ink contained in any cartridges in which metallic ions may be released in the ink by virtue of the presence of air containing oxygen and/or oxygen plus water vapor which would otherwise result in corrosion of the metal.

We claim:

1. A ball pen ink cartridge comprising a nib and a body, at least one of which includes copper or copper alloy, and which cartridge permits air and moisture to enter into contact with ball pen ink contained within said cartridge, where said ball pen ink consists essentially of:

(a) liquid polar organic carrier, about 30-70 weight percent;

(b) carrier soluble fatty acid having 4-20 carbon atoms, about 1-25 weight percent;

(c) about 5-50 weight percent of carrier soluble resin selected from the class consisting of coal tar, coumarone, coumarone-indene, phenol-modified-coumarone, phenol-modified-coumarone-indene, hexanetriol phthalate resin, ketone condensate, ketone-aldehyde condensate, pine tar, polyvinylpyrrolidone, zein, and mixtures thereof;

(d) dye, pigment, or mixtures thereof, in an amount suitable for producing the desired colored line; and (e) carrier soluble additive from the class of (1) antioxidants, (2) corrosion inhibitors, and (3) mixtures thereof where said (1) antioxidants are selected from the group consisting of octylated diphenylamine, isopropoxy diphenylamine, condensate of acetone and diphenylamine, aldol-alpha-naphthylamine, phenylbeta-naphthylamine-isopropoxy, phenyl-beta-naphthylamine, diaryl-para-phenylene diamine, alkylaryl-para-diphenylene diamine, 2,2-methylene-bis-(4-ethyl-6-tertiary butyl phenol), 2,2-methylene-bis-(4-methyl-6-tertiary butyl phenol), 2,6-ditertiary butyl-4-methyl phenol, styrenated phenol, hindered phenol, polymeric hindered phenol, lauryl-paraaminophenol, stearyl-paraaminophenol, N-acetyl-para-aminophenol, N-butyryl-para-phenol, 2,2-thiobis-(4-methyl-6-tertiary butyl phenol), 1,1-thiobis-(2-naphthol), hydroquinone, 2,5-ditertiary butylhydroquinone, 2,5-ditertiary amylhydroquinone, monotertiary butylhydroquinone, hydroquinone monomethyl ether, hydroquinone monobenzyl ether, octadecyl-3-(-3',5'-ditertiary butyl-4') hydroxyphenyl propionate, dilauryl thiopropionate, ditertiary butylthiodipropionate, butylated hydroxyanisole, 4-dodecyloxy-2-hydroxybenzophenone, and polymerized trimethyl dihydroquinoline, and said (2) corrosion inhibitors are selected from the group consisting of sorbitan fatty acid ester, trimer acid, nonylphenoxy acetic acid, N,N'-disalicylol-1,2-propanediamine, bis (octylphenyl)hydrogen phosphatediethylamine, octylphenyl dihydrogen phosphate diethylamine, mixtures of said diethylamine salts, mercaptobenzothiazole, and sodium-2-mercaptobenzothiazole, and mixtures thereof, where said antioxidant, when present, is present, in an amount of 0.5-10 weight percent, where said corrosion inhibitor, when present, is present in an amount of about 0.1-5 weight percent, and said weight percents of antioxidant and corrosion inhibitor are based on the weight of the ink components: carrier, fatty acid, resin, dye and pigment, whereby the formation of ink-flow-preventing crystalline mass in said cartridge is prevented as a result of entering oxygen and moisture which react with ink components and with the copper or copper alloy to form said crystalline mass, in the absence of said additive.

2. The ball pen cartridge of claim 1 wherein said carrier is a polyhydric alcohol having a surface tension within the range of 20–60 dynes per square centimeter.

3. The ball pen cartridge of claim 1 wherein the only additive present in said ink is the antioxidant 2,2-methylene-bis-(4-methyl-6-tertiary butyl phenol).

4. The ball pen cartridge of claim 1 where the only additive present in said ink is the antioxidant 2,2-methylene-bis-(4-ethyl-6-tertiary butyl phenol).

5. The ball pen cartridge of claim 1 wherein the only additive present in said ink is the corrosion inhibitor bis(octylphenyl) hydrogen phosphate diethylamine.

6. The ball pen cartridge of claim 1 wherein the only additive present in said ink is the corrosion inhibitor mixed salts of bis (octyphenyl) hydrogen phosphate diethylamine and octylphenyl dihydrogen phosphate diethylamine.

7. The ball pen cartridge of claim 1 wherein both antioxidant and corrosion inhibitor are resent in said ink and said antioxidant is 2,2-methylene-bis-(4-ethyl-6-tertiary butyl phenol) or 2,2-methylene-bis-(4-methyl-6-tertiary butyl phenol) and said corrosion inhibitor is bis (octylphenyl) hydrogen phosphate diethylamine, octylphenyl dihydrogen phosphate diethylamine, or mixtures thereof.

8. The ball pen cartridge of claim 1 wherein the amount of antioxidant, when present, is about 1–3 weight percent, and the amount of corrosion inhibitor, when present, is about 0.05–2 weight percent.

9. The ball pen cartridge of claim 1 wherein said nib includes copper or copper alloy and said body includes air-permeable polyolefin.

10. The ball pen cartridge of claim 9 wherein said polyolefin is polyethylene or polypropylene.

* * * * *